(12) United States Patent
Pandit et al.

(10) Patent No.: US 12,547,463 B2
(45) Date of Patent: Feb. 10, 2026

(54) SYSTEM AND METHOD FOR MANAGING CLOUD SERVICE RESOURCES IN A CLOUD COMPUTING ENVIRONMENT

(71) Applicant: Microsoft Technology Licensing, LLC, Redmond, WA (US)

(72) Inventors: Sachin Subraya Pandit, Santa Clara, CA (US); Qun Guo, Seattle, WA (US); Pankaj Arora, Sammamish, WA (US); Shize Xu, Redmond, WA (US); Venkat Parthasarathy, San Jose, CA (US); Ajay Kalhan, Redmond, WA (US); John M. Oslake, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 769 days.

(21) Appl. No.: 17/821,089

(22) Filed: Aug. 19, 2022

(65) Prior Publication Data

US 2024/0061714 A1 Feb. 22, 2024

(51) Int. Cl.
*G06F 9/50* (2006.01)
(52) U.S. Cl.
CPC .......... *G06F 9/5038* (2013.01); *G06F 9/5072* (2013.01)

(58) Field of Classification Search
None
See application file for complete search history.

(56) References Cited

U.S. PATENT DOCUMENTS

2017/0286153 A1 10/2017 Bak et al.
2018/0004795 A1 1/2018 Kalhan et al.

OTHER PUBLICATIONS

"International Search Report and Written Opinion Issued in PCT Application No. PCT/US23/027705", Mailed Date: Aug. 28, 2023, 11 Pages.

*Primary Examiner* — Eric C Wai
(74) *Attorney, Agent, or Firm* — Weaver IP L.L.C.

(57) ABSTRACT

Systems, methods, and devices are described for managing cloud services implemented by one or more clusters in a cloud computing environment. Responsive to receiving a first notification indicating that a cloud service implemented by the one or more clusters has not been used for a first predetermined amount of time, the cloud service is maintained in an active state and metadata is updated that specifies the cloud service is in a deactivated state. The metadata is visible to a user interface of a management portal of the cloud computing environment. Responsive to receiving a second notification indicating that the cloud service has not been used for a second predetermined amount of time following the first predetermined amount of time, a deactivation workflow is instantiated to deactivate the cloud service. In a further aspect, a cloud service engine generates the first and second notifications.

20 Claims, 5 Drawing Sheets

500

Receive a notification that a cloud service has been used during a second predetermined amount of time following a first predetermined amount of time — 502

Responsive to receiving the notification: — 504
- Maintain the cloud service in an active state — 504A
- Update metadata to specify that the cloud service is in the active state — 504B

Detect user activity with respect to a cloud service after instantiating a deactivation workflow — 602

Responsive to detecting the user activity with respect to the cloud service after instantiating the deactivation workflow, performing by a workflow service: — 604
- Instantiate an activation workflow for the cloud service — 604A
- Roll back the deactivation workflow — 604B

Remove a compute resource related to a cloud service from one or more clusters that implement the cloud service — 702

Unlink a remote storage attached to a node of the one or more clusters that implement the cloud service — 704

FIG. 7

SYSTEM AND METHOD FOR MANAGING CLOUD SERVICE RESOURCES IN A CLOUD COMPUTING ENVIRONMENT

BACKGROUND

In cloud computing, cloud services are typically deployed on a fleet of servers. For example, in a database-as-a-service implementation, a database service is implemented by one or more nodes in one or more clusters of a cloud computing environment. The database service uses various resources of the node (e.g., processors, memories, storage interfaces, network functionalities, and/or the like). The resources available within the cloud computing environment are finite in number. In the cloud computing environment, a system manages the use of available resources and placement of services within the environment.

A conventional system for managing the use of resources in a cloud computing environment uses a cloud service engine of a cloud service to determine whether or not a user has utilized the cloud service over a period of time. In the conventional system, if a user has not utilized the cloud service, the cloud service is deactivated and will require reactivation in order for the user to use the cloud service again. The deactivation and activation processes are resource-intensive tasks that may consume a significant amount of time. This can adversely impact the ability of the cloud computing environment to quickly provide cloud services. As a cloud computing environment expands to more and more users or implements more cloud services, this task can become a significant bottleneck for the cloud computing environment.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Systems, methods, and devices are described herein for managing cloud services implemented by one or more clusters in a cloud computing environment. In a first aspect, responsive to receiving a first notification indicating that a cloud service implemented by the one or more clusters has not been used for a first predetermined amount of time, a workflow service maintains the cloud service in an active state and updates metadata stored in a metadata store. The metadata specifies the cloud service is in a deactivated state and is visible to a user interface of a management portal of the cloud computing environment. Responsive to receiving a second notification indicating that the cloud service has not been used for a second predetermined amount of time following the first predetermined amount of time, the workflow service instantiates a deactivation workflow to deactivate the cloud service.

In a further aspect, a cloud service implemented by one or more clusters in a cloud computing environment includes a cloud service engine that detects that a cloud service has not been used for a first predetermined time and determines if the cloud service has not been used for a second predetermined amount of time following the first predetermined amount of time. One or more computers in the cloud computing environment implement a workflow service. The workflow service, responsive to the cloud service engine detecting that the cloud service has not been used for the predetermined amount of time, maintains the cloud service in an active state and updates metadata stored in a metadata store. The metadata specifies that the cloud service is in a deactivated state and is visible to a user interface of a management portal of the cloud computing environment. Responsive to the cloud service engine determining that the cloud service has not been used for the second predetermined amount of time, the workflow service instantiates a deactivation workflow to deactivate the cloud service.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

FIG. 5 depicts a flowchart of a process for logically resuming a cloud service, in accordance with an embodiment.

FIG. 6 depicts a flowchart of a process for activating a cloud service, in accordance with an embodiment.

FIG. 7 depicts a flowchart of a process for deactivating a cloud service, in accordance with an embodiment.

Figure 1:
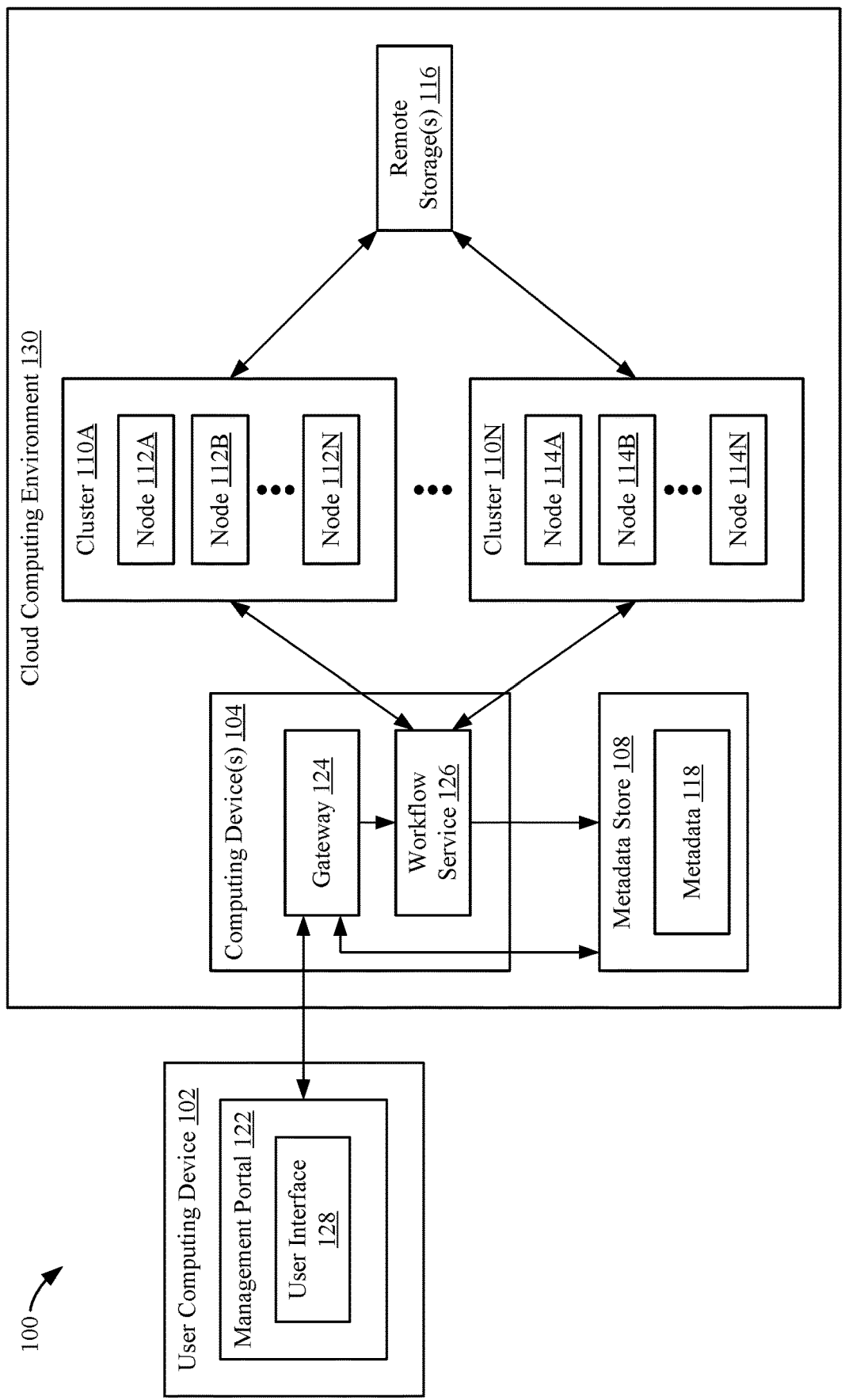
FIG. 1 is a block diagram of a system for managing cloud services implemented by one or more clusters in a cloud computing environment, in accordance with an embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives such as "substantially" and "about" modifying a condition or relationship characteristic of a feature or features of an implementation of the disclosure, should be understood to mean that the condition or characteristic is defined to within tolerances that are acceptable for operation of the implementation for an application for which it is intended. Furthermore, if the performance of an operation is described herein as being "in response to" one or more factors, it is to be understood that the one or more factors may be regarded as a sole contributing factor for causing the operation to occur or a contributing factor along with one or more additional factors for causing the operation to occur, and that the operation may occur at any time upon or after establishment of the one or more factors. Still further, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

Numerous example embodiments are now described. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Systems and Methods for Managing Cloud Services

In a cloud computing environment, cloud services may be implemented by one or more clusters of the cloud computing environment. Each cluster may include one or more nodes. Each node may comprise, for example, a physical machine or a virtual machine. The cloud service may utilize various resources of the node (e.g., processors, memories, storage interfaces, network functionalities, and/or the like). As set forth in the Background section, the resources available within the cloud computing environment are finite in number. Systems are implemented to manage the use of available resources and placement of services within the environment. For instance, such systems may include a workflow service that instantiates activation and deactivation workflows to activate and deactivate cloud services implemented by the one or more clusters in the cloud computing environment. To activate a cloud service, the workflow service instantiates an activation workflow. The activation workflow may include a placement algorithm that decides which node(s) to deploy the cloud service on based on various resource utilization factors. The activation workflow includes updating information visible to a user interface of a management portal of the cloud computing environment to specify that the cloud service is in an active state.

In cloud computing applications, if a user has not utilized a cloud service over a period of time, the workflow service instantiates a deactivation workflow to deactivate the cloud service and update the information visible to the user interface to specify that the cloud service is in a deactivated state. As set forth in the Background section, the deactivation and activation workflows are resource-intensive tasks that may consume a significant amount of time. This can adversely impact the ability of the cloud computing environment to quickly provide cloud services. As a cloud computing environment expands to more and more users or implements more cloud services, this task can become a significant bottleneck for the cloud computing environment.

Embodiments described herein decouple the perception of cloud service deactivation with actual cloud service deactivation in the cloud computing environment. For example, a system according to an embodiment described herein performs a "logical pause" in response to detecting that a cloud service (e.g., a serverless application) has not been used for a first predetermined amount of time. The logical pause process includes maintaining the cloud service in an active state and updating information visible to a user interface of a management portal of the cloud computing environment to specify that the cloud service is in a deactivated state. In response to determining that the cloud service has not been used for a second predetermined amount of time following the first predetermined amount of time, the system performs a "physical pause." The physical pause process includes instantiating a deactivation workflow to deactivate the cloud service.

Embodiments described herein may be implemented in a manner that addresses certain technical challenges. These challenges include (1) decreasing workflow latency, (2) reducing workflow failure rate, (3) reducing internal service load, and (4) avoiding race conditions. Each of these challenges will now be briefly described.

Decreasing Workflow Latency. Workflows associated with cloud services involve communication between various services within the cloud computing environment, increasing the latency in performing certain functions with respect to the cloud service. For example, the time to perform an activation workflow for a cloud service implemented in a cloud computing environment according to an embodiment directly impacts the login latency for the cloud service.

Reducing Workflow Failure Rate. As discussed above, a workflow associated with a cloud service involves communication between various services within the cloud computing environment. For instance, a physical pause may include several decision making steps, each step increasing the probability of workflow failure. If any of the services fail during the workflow, a system in accordance with an embodiment rolls back the workflow or times out the workflow. Potential failure points include: node health issues, internal service (e.g., workflow services, gateway services, cluster services (e.g., service Fabric), and/or the like) failure, failure to start a cloud service, and/or any other failure or issue that causes the workflow associated with the cloud service to fail.

Reducing Internal Service Load. As the number of cloud services implemented in a cluster increases, the number of activation and deactivation workflows proportionately increases as well, leading to a higher load on the internal services. This load further increases in complex workflow implementations. Large numbers of workflows and/or complex workflows can quickly overwhelm internal services within a cloud computing environment.

Avoiding Race Conditions. Race conditions may occur if user attempts to utilize a service during a corresponding deactivation workflow.

A system in accordance with an embodiment intelligently performs a logical pause in a manner that addresses at least the challenges noted above. For example, a system described herein determines that a cloud service should be activated subsequent to a logical pause and prior to a physical pause. In this context, the system logically resumes the cloud service by updating the information visible to the user interface. In this case, the logical resume process is significantly faster than a physical resume.

Embodiments may be implemented in various ways. For instance, FIG. 1 is a block diagram of a system 100 for managing cloud services implemented by one or more clusters in a cloud computing environment, in accordance with an embodiment. As shown in FIG. 1, system 100 includes a user computing device 102 and a cloud computing environment 130. Cloud computing environment 130 includes one or more computing device(s) 104 ("computing device(s) 104" herein), a metadata store 108, clusters 110A and 110N (collectively referred to as "clusters 110" herein), and one or more remote storage(s) 116 ("remote storage 116" herein).

Metadata store 108 comprises organized collections of metadata stored and accessed electronically. For example, as shown in FIG. 1, metadata store 108 is accessible by gateway 124 and workflow service 126 (executing on computing device(s) 104) and stores metadata 118. Metadata 118 includes information that specifies the state of cloud services implemented by clusters 110 (e.g., active state, deactivated state, deactivating state, or activating state). Based on the specified state, system 100 directs interactions between user computing device 102 and cloud services implemented on clusters 110 either to the cloud service or computing device(s) 104, as will be described further below. While metadata store 108 is shown external to computing device(s) 104 in FIG. 1, in some embodiments metadata store 108 is internal to computing device(s) 104.

Remote storage 116 comprises organized collections of data remotely stored and accessed electronically by clusters 110. Remote storage 116 stores remote storage files (e.g., database data, data corresponding to cloud services implemented by clusters 110, and/or other remotely stored files associated with system 100). While metadata store 108 and remote storage 116 are shown as separate storages in FIG. 1, in some embodiments remote storage 116 includes metadata store 108.

User computing device 102 and computing device(s) 104 may include any number of computing devices, including ones, tens, hundreds, thousands, millions, or even greater numbers of computing devices. User computing device 102 and computing device(s) 104 may comprise stationary computing devices and/or mobile computing devices. Examples of stationary computing devices include but are not limited to desktop computers, personal computers (PCs), and servers. Example of mobile computing device include but are not limited to a laptop computer, a notebook computer, a tablet computer, a mobile phone, a personal digital assistant (PDA), and a wearable computing device.

User computing device 102 executes computer programs (e.g., applications or services) that interact with computing device(s) 104 and/or cloud services executing on clusters 110 via one or more networks (e.g., the Internet, the "cloud", business networks, and/or enterprise networks) and/or direct connections (e.g., communication links), or any combination thereof. For example, such computer programs may submit queries for execution by a cloud service implemented by clusters 110. As shown in FIG. 1, user computing device 102 includes a management portal 122 that includes a user interface 128. Management portal 122 is a service that enables a user of user computing device 102 to view the state of one or more associated cloud services implemented by clusters 110 and manage the associated cloud services. As shown in FIG. 1, management portal 122 is executing on user computing device 102; however, it is also contemplated that management portal 122 may be hosted by one or more computing devices of cloud computing environment 130 (e.g., computing device(s) 104) and accessed by a user interface of user computing device 102 via a network. In accordance with an embodiment, user interface 128 is configured to display the state of associated cloud services by accessing metadata 118 (e.g., via gateway 124 or a communication link established between user interface 128 and metadata store 108). Computer programs executing on user computing device 102 may interface with computing device(s) 104 and/or cloud services implemented by clusters 110 through application programming interfaces (APIs) and/or by other mechanisms.

Computing device(s) 104 execute internal services corresponding to a control plane of cloud computing environment 130. As shown in FIG. 1, computing device(s) 104 include a gateway 124 and a workflow service 126. Gateway 124 and workflow service 126 may be implemented as (i.e., internal) services executing on computing device(s) 104. In accordance with an embodiment gateway 124 and workflow service 126 are implemented as a single service. Gateway 124 bridges communications between management portal 122 and workflow service 126. Workflow service 126 instantiates and manages workflows with respect to cloud services, logically pauses cloud services, logically resumes cloud services, and updates metadata 118 in accordance with workflows managed by workflow service 126. Workflow service 126 is communicatively coupled to clusters 110 (e.g., via a network). Depending on the implementation, workflow service 126 may communicate directly with nodes of clusters 110 or with a cluster service associated with one or more of clusters 110.

As shown in FIG. 1, clusters 110 includes cluster 110A and cluster 110N, however, it is also contemplated herein that clusters 110 may be a single cluster or any number of clusters including ones, tens, hundreds, or even greater numbers of clusters. Each cluster of clusters 110 may include any number of respective nodes including ones, tens, hundreds, thousands, millions, or even greater numbers of nodes. For example, as shown in FIG. 1, cluster 110A includes nodes 112A, 112B, and 112N (collectively referred to as "nodes 112" herein), and cluster 110N includes nodes 114A, 114B, and 114N (collectively referred to as "nodes 114" herein). Furthermore, clusters 110 may include nodes of a single type (e.g., physical machines or virtual machines) or different types (e.g., physical machines and virtual machines). In some embodiments, clusters 110 are divided into multiple sub-clusters. Each of clusters 110 may host a cluster service (e.g., Azure® Service Fabric service) (not shown in FIG. 1) that manages the individual cluster (e.g., balances cloud services executing on nodes, receives communications from workflow service 126, transmits communications from nodes of the cluster to workflow service 126). In accordance with an embodiment, clusters 110 are implemented in a data plane of the cloud computing environment 130.

A user of user computing device 102 may submit a request to use a cloud service via user interface 128. If metadata 118 specifies that the cloud service is active, user computing device 102 transmits the request to the cloud service. If metadata 118 indicates that the cloud service is in a state other than active, user computing device 102 transmits the request to gateway 124. Gateway 124 processes the request and transmits an activation request notification to workflow service 126 including instructions to activate the requested cloud service. Workflow service 126 determines if the cloud service is deactivated or logically paused. If the cloud service is deactivated, workflow service 126 instantiates an activation workflow to activate the cloud service. If the cloud service is logically paused, workflow service 126 performs a logical resume process. Examples of an activation workflow and a logical resume process will be discussed further below with respect to FIG. 2. In accordance with an embodiment, workflow service 126 (or a cluster service of one or more clusters 110 not shown in FIG. 1) uses a placement algorithm to determine which node or nodes to implement the cloud service on. The placement algorithm chooses how to implement the cloud service based on certain criteria (e.g., capacity of nodes, hardware resources of nodes, or computing power of a node). In accordance with an embodiment, the activation workflow includes one or more of: launching a cloud service engine, launching a service associated with the cloud service (e.g., a billing service, a provisioning service, or a runtime service), establishing a link between remote storage 116 and one or more of nodes 112 and/or nodes 114, allocating a resource of a node to the cloud service, reclaiming a resource corresponding to the cloud service, and/or any other steps associated with activating a cloud service implemented in one or more of clusters 110.

As will be described further below with respect to FIG. 2, workflow service 126 receives notifications from cloud service engines of a cloud service and/or gateway 124 indicating whether or not the cloud service has been used within certain amounts of time. Depending on the user activity or lack thereof, workflow service 126 instantiates activation workflows, instantiates deactivation workflows, instantiates reactivation workflows, logically pauses a cloud service, and/or logically resumes a cloud service.

To help further illustrate the features of workflow service 126 in accordance with embodiments, FIG. 2 will now be described. FIG. 2 is a block diagram of another system 200 for managing cloud services implemented by one or more clusters in a cloud computing environment, in accordance with an embodiment. System 200 may be implemented in cloud computing environment 130 of FIG. 1. As shown in FIG. 2, system 200 includes workflow service 126, as described above with respect to FIG. 1. As further shown in FIG. 2, system 200 includes a node 202. Node 202 may be any one of nodes 112 or 114, as described above with respect to FIG. 1, or, alternatively, another node of cloud computing environment 130. Node 202 includes a local agent 204, a cloud service 206, and one or more resource(s) 208 ("resources 208" herein).

As described above in reference to FIG. 1, workflow service 126 is communicatively coupled to clusters 110. For example, as shown in FIG. 2, workflow service 126 is communicatively coupled to local agent 204 of node 202. In an alternative embodiment, workflow service 126 is coupled to a cluster service (not shown in FIG. 2) that manages communication between workflow service 126 and node 202.

Cloud service 206 may be a database service (e.g., a database as a service), a function service (e.g., a function as a service), or any other type of cloud service or cloud application implemented by cloud computing environment 130. In accordance with an embodiment, cloud service 206 is a serverless service (e.g., a serverless application). Furthermore, while node 202 is illustrated in FIG. 2 as implementing cloud service 206, it is also contemplated herein that node 202 may implement (e.g., host) any number of cloud services. As shown in FIG. 2, cloud service 206 includes a cloud service engine 210, a billing service 212, and one or more sub-service(s) 214 ("sub-services 214"). In accordance with an embodiment, billing service 212 is a resource governance service that monitors usage of cloud service 206 (e.g., time that cloud service 206 is in an active state or time that cloud service 206 is perceived to be in an active state) for billing purposes. Sub-services 214 may include a provisioning service, a runtime service, and/or any other service associated with cloud service 206. In accordance with an embodiment, cloud service 206 does not include one or more of billing service 212 and/or sub-services 214. In accordance with another embodiment, billing service 212 and one or more of sub-services 214 are incorporated in the same sub-service of cloud service 206. In accordance with yet another embodiment, billing service and/or sub-services 246 are external to cloud service 206.

Figure 2:
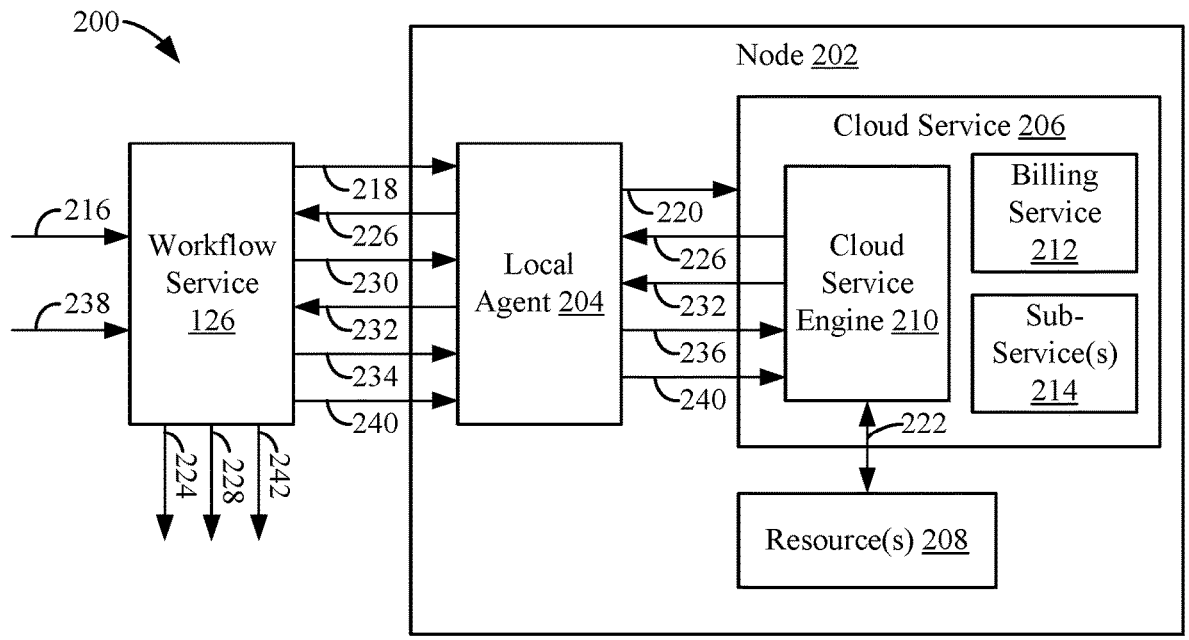
FIG. 2 is a block diagram of another system for managing cloud services implemented by one or more clusters in a cloud computing environment, in accordance with an embodiment.

As shown in FIG. 2, workflow service 126 receives an activation request notification 216 from gateway 124 of FIG. 1. Activation request notification 216 includes instructions to activate cloud service 206. Responsive to receiving activation request notification 216, workflow service 126 determines whether cloud service 206 is in a deactivated state or logically paused. Workflow service 126 determines the state of cloud service 206 by performing one or more of: communicating with node 202, communicating with one or more of clusters 110, communicating with cluster service(s) of cloud computing environment 130, accessing metadata 118, and/or another mechanism for determining whether or not cloud service 206 is in a deactivated state or logically paused. For purposes of the following description, responsive to receiving activation request notification 216, workflow service 126 determines that cloud service 206 is in a deactivated state and instantiates an activation workflow. The activation workflow retrieves metadata 118 from metadata store 108 and, optionally, any corresponding data from remote storage 116 (e.g., database data, application data, etc.). The activation workflow creates a new instance of cloud service 206. For example, as shown in FIG. 2, workflow service 126 transmits activation signal 218 to local agent 204 of node 202, which launches cloud service 206 via launch signal 220. In accordance with an embodiment, workflow service 126 updates metadata 118 during the activation workflow to specify that cloud service 206 is in the activating state.

Launch signal 220 includes instructions to launch cloud service engine 210, billing service 212, and sub-services 214 of cloud service 206. In accordance with an embodiment, the instructions included in launch signal 220 include steps that create or attach one or more of resources 208 via a communication link 222. For instance, the instructions may include a step that attaches a storage interface resource to cloud service engine 210 via communication link 222 and links remote storage 116 to the storage interface resource (e.g., via a communication link not shown in FIG. 2) as part of the activation workflow.

Once cloud service 206 is activated, workflow service 126 transmits update signal 224 to metadata store 108 of FIG. 1 to update metadata 118 to specify that cloud service 206 is in an active state, as well as which node(s) cloud service 206 is implemented on. A user associated with user computing device 102 is able to interact with cloud service 206 (e.g., via user interface 128, management portal 122, or another application executing on user computing device 102).

Cloud service engine 210 monitors user activity associated with cloud service 206. If cloud service engine 210 detects user activity within a first predetermined amount of time, cloud service engine 210 resets a coldness timer that tracks the amount of time since user activity was last detected. Cloud service engine 210 may detect user activity in a variety of ways. For example, cloud service engine 210 may include a background thread that runs every hour (or some other configurable time period) and checks each instance of cloud service 206. In particular, the background thread may check, for each instance of cloud service 206 (e.g., across any number of nodes including node 202), various signals. For instance, embodiments may check to ensure that there are no active logins, monitor primary workload resource indicators (e.g., indicators indicating no active sessions, no active workers, no active requests, no new requests completed, no resource consumption by user workloads, no CPU usage, no entity is holding lock on cloud service 206, no pending log for a backup), and/or otherwise check a signal to detect user activity associated with the cloud service. If cloud service engine 210 does not detect user activity within the first predetermined amount of time, cloud service engine 210 generates notification 226. Local agent 204 transmits notification 226 to workflow service 126.

The first predetermined amount of time may be configurable by a user of user computing device 102 of FIG. 1, a system administrator, or a developer associated with cloud computing environment 130. In accordance with an embodiment, the first predetermined amount of time is configurable on a customer-by-customer basis for different customers of cloud computing environment 130. Cloud service engine 210 in accordance with an embodiment detects that the first predetermined amount of time has passed using a coldness timer that tracks the amount of time since user activity was last detected. Alternatively, cloud service engine 210 detects that the first predetermined amount of time has passed by detecting a delta between a last active update time and the results of a request asking for the current time. When this delta crosses a threshold (which may be configurable, as described herein), notification 226 is generated.

Responsive to receiving notification 226, workflow service 126 logically pauses cloud service 206. Workflow service 126 transmits update signal 228 to metadata store 108 of FIG. 1 to update metadata 118 to specify that cloud service 206 is in a deactivated state. By updating metadata 118 in this manner, user interface 128 displays the state of cloud service 206 as deactivated while system 200 maintains cloud service 206 in the active state. By maintaining cloud service 206 in the active state, the time to reactivate cloud service 206 is reduced, which decreases the time to instantiate and perform workflows, reduces failure rate of activation and/or deactivation workflows, reduces load on workflow service 126, and reduces the chance race conditions occur with respect to workflow service 126 instantiating activation and/or deactivation workflows.

In some embodiments, and as shown in FIG. 2, workflow service 126 transmits command 230 to local agent 204 in response to receiving notification 226. Command 230 may include instructions to stop (e.g., pause) billing service 212, deactivate one or more of sub-services 214, and/or release one or more of resources 208. Workflow service 126 in accordance with an embodiment determines a subset of resources 208 may be released while maintaining cloud service 206 in an active state and generates command 230 to include instructions that, when received by logical agent 204, cause the determined subset of resources 208 to be released. The subset of resources 208 to be released may include resources that require less time to reclaim during reactivation of cloud service 206, resources that are not necessary to reclaim during reactivation of cloud service 206 (e.g., a cache), resources that are constrained within cloud computing environment 130, and/or any other resources that workflow service 126 determines may be released as part of a logical pause process. By selectively deactivating sub-services and/or releasing resources, system 200 is able to reduce computing resources used by cloud services in a logically paused state with little or no impact on logical resume performance.

As stated above, cloud service engine 210 is configured to monitor user activity associated with cloud service 206. If cloud service engine 210 does not detect user activity within a second predetermined amount of time following the first predetermined amount of time, cloud service engine 210 generates notification 232. Local agent 204 transmits notification 232 to workflow service 126.

The second predetermined amount of time may be configurable by a system administrator of system 200 or a developer associated with cloud computing environment 130 of FIG. 1. In accordance with an embodiment, the second predetermined amount of time is configurable on a customer-by-customer basis for different customers of cloud computing environment 130. Cloud service engine 210 in accordance with an embodiment detects that the second predetermined amount of time has passed in a manner similar to any of those described above with respect to the first predetermined amount of time or otherwise described elsewhere herein.

Responsive to receiving notification 232, workflow service 126 physically pauses cloud service 206. Workflow service 126 instantiates a deactivation workflow to start deactivating cloud service 206. Deactivation workflow includes transmitting a deactivation signal 234 to local agent 204, which transmits terminate signal 236 to deactivate cloud service 206. Deactivating cloud service 206 includes one or more of: locking cloud service 206 during said deactivating, backing up a transaction log associated with cloud service 206 (e.g., as a remote storage file stored in remote storage 116), removing a compute resource related to cloud service 206 from the one or more clusters implementing cloud service 206, unlinking remote storage 116 attached to node 202 (not shown in FIG. 2), dropping a runtime resource associated with cloud service 206, and/or any other steps associated with deactivating a cloud service implemented in one or more clusters of a cloud computing environment. After cloud service 206 is deactivated, further user activity with respect to cloud service 206 triggers an activation workflow, as described above. By deactivating cloud service 206, system 200 enables node 202 and resources 208 to be utilized by other cloud services deployed on, or deployable to, node 202.

As described above with respect to FIG. 1, if metadata 118 specifies that cloud service 206 is in a deactivated state, requests from a user to use cloud service 206 are directed to gateway 124 of FIG. 1. In response to receiving the user request, gateway 124 transmits a reactivation request notification 238 to workflow service 126. In response to receiving reactivation request notification 238, workflow service 126 determines if cloud service 206 is in a deactivated state or logically paused. Workflow service 126 may determine cloud service 206 is in a deactivated state or logically paused by communicating with a cluster service of one or more clusters 110, communicating with one or more local agents of nodes such as local agent 204, accessing metadata 118 stored in metadata 108, and/or another mechanism. If cloud service 206 is in a deactivated state, workflow service 126 instantiates an activation workflow and cloud service 206 is activated as described above.

If cloud service 206 is logically paused, workflow service 126 performs a logical resume process. The logical resume process includes maintaining cloud service 206 in an active state and transmitting update signal 242 to metadata store 108 of FIG. 1 to update metadata 118 to specify that cloud service 206 is in an active state. In accordance with an embodiment, workflow service 126 or gateway 124 transmits an indication (not shown in FIG. 2) that user activity has been detected to cloud service engine 210 (e.g., via a communication link to local agent 204). Responsive to receiving the indication, cloud service engine 210 resets the coldness timer that tracks the amount of time since user activity was last detected. The indication may include information associated with the user request received by gateway 124 corresponding to reactivation request notification 238. In some embodiments, workflow service 126 transmits a command (not shown in FIG. 2) to local agent 204 that includes instructions to restart billing service 212, reclaim and/or create any released resources (e.g., resources released in response to command 230), and/or activate sub-services deactivated in response to command 230.

In some cases, workflow service 126 receives reactivation request notification 238 during the deactivation workflow. In this case, workflow service 126 cancels the deactivation workflow by transmitting abort signal 240 to local agent 204 (as well as any other local agents of other nodes and/or cluster services of clusters implementing cloud service 206, not shown in FIG. 2), rolling back changes to metadata 118, rolling back any other changes with respect to cloud service 206 and/or cloud computing environment 130 of FIG. 1, and/or otherwise cancelling the deactivation workflow. In other words, if user activity associated with cloud service 206 is detected during the deactivation workflow, the activation of cloud service 206 should take precedence without having to wait for the deactivation workflow to complete. In some embodiments, workflow service 126 instantiates a (re)activation workflow as part of rolling back changes with respect to cloud service 206. Alternative to cancelling the deactivation workflow, the deactivation workflow locks cloud service 206 during deactivation. In this alternative, workflow service 126 reactivates cloud service 206 by instantiating an activation workflow subsequent to the completion of the deactivation workflow.

Figure 3:
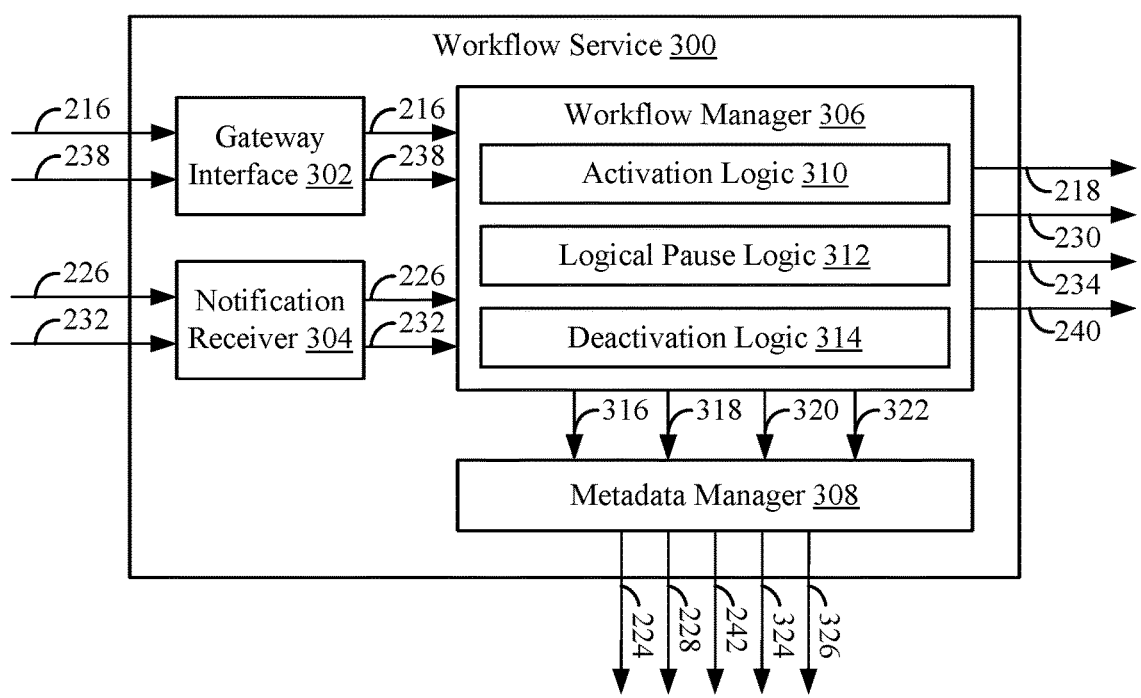
FIG. 3 is a block diagram of a workflow service, in accordance with an embodiment.

Workflow services may be configured in various ways. For example, FIG. 3 is a block diagram of a workflow service 300, in accordance with an embodiment. Workflow service 300 is a non-limiting example implementation of workflow service 126 of FIGS. 1 and 2. Further structural and operational examples will be apparent to persons skilled in the relevant art(s) based on the following descriptions. As shown in FIG. 3, workflow service 300 includes a gateway interface 302, a notification receiver 304, a workflow manager 306, and a metadata manager 308.

Gateway interface 302 receives notifications from gateway 124 of FIG. 1 (e.g., activation request notification 216, reactivation request notification 238, and/or other notifications from gateway 124), optionally processes the notifications, and provides the (e.g., processed) notifications to workflow manager 306.

Notification receiver 304 receives notifications from clusters and/or nodes managed by workflow service 300 (e.g., notifications 226 and/or 232 from node 202 of FIG. 2), optionally processes the notifications, and provides the (e.g., processed) notifications to workflow manager 306.

Workflow manager 306 receives and analyzes notifications in order to determine whether to instantiate activation workflows, instantiate deactivation workflows, logically pause a cloud service, and/or logically resume a cloud service. Workflow manager 306 includes activation logic 310, logical pause logic 312, and deactivation logic 314. Activation logic 310 includes logic for instantiating activation workflows, logically resuming cloud services, rolling back a deactivation, and/or otherwise performing actions associated with activating a cloud service. Logical pause logic 312 includes logic for logically pausing a cloud service. Deactivation logic 314 includes logic for instantiating deactivation workflows and/or otherwise performing actions associated with deactivating a cloud service.

Responsive to receiving a notification (e.g., activation request notification 216 or reactivation request notification 238) to activate a cloud service, workflow manager 306 utilizes activation logic 310 to determine if the cloud service is logically paused, in a deactivated state, or deactivating (e.g., via a deactivation workflow). If the cloud service is logically paused, workflow manager 306 utilizes activation logic 310 to logically resume the cloud service by transmitting update command 316 to metadata manager 308. Update command 316 includes instructions to update metadata 118 corresponding to the cloud service to specify that the cloud service is in an active state. In embodiments, logically resuming a cloud service utilizes less compute resources than instantiating an activation workflow, thereby decreasing workflow latency, reducing workflow failure rate during reactivation of a logically paused resource, increasing system performance, and reducing load on internal services.

If the cloud service is in a deactivated state, workflow manager 306 utilizes activation logic 310 to transmit update command 318 to metadata manager 308 and instantiate an activation workflow that includes generating activation signal 218. Update command 318 includes instructions to update metadata 118 corresponding to the cloud service to specify that the cloud service is in an activating state.

If the cloud service is in a deactivating state, workflow manager 306 utilizes activation logic 310 to transmit update command 318 to metadata manager 308 and instantiate an activation workflow that includes generating abort signal 240 and rolling back the deactivation workflow. In any case, after an instantiated activation workflow has activated a cloud service, workflow manager 306 transmits update command 316 to metadata manager 308.

Responsive to receiving a notification indicating a cloud service has not been used for a first predetermined amount of time (e.g., notification 226), workflow manager 306 utilizes logical pause logic 312 to logically pause the cloud service by transmitting update command 320 to metadata manager 308 and optionally transmitting command 230 to local agent 204 of FIG. 2. Update command 320 includes instructions to update metadata 118 corresponding to the cloud service to specify that the cloud service is in a deactivated state. By logically pausing a cloud service in this manner, workflow manager 306 reduces workflow failure rate by reducing the steps to logically deactivate a cloud service (e.g., by updating metadata 118 while maintaining the cloud service in an active state and optionally releasing a subset of resources). Furthermore, deactivation workflows may be complex or resource intensive processes. By logically pausing a cloud service, workflow manager 306 reduces internal service load on gateway 124, workflow service 300, and/or cloud service engines (e.g., cloud service engine 210), and/or performance load on computing devices of a cloud computing environment (e.g., computing device (s) 104 and/or nodes of clusters 110 (e.g., nodes 112, 114, and/or 202)).

As described elsewhere herein, in some embodiments, logically pausing the cloud service includes generating command 230 and/or otherwise releasing a subset of resources and/or deactivating sub-services associated with the cloud service. In this context, and as shown in FIG. 3, workflow manager 306 utilizes logical pause logic 312 to transmit an update command 322 to metadata manager 308 prior to beginning, or as part of, the logical pause process. Update command 322 includes instructions to update metadata 118 corresponding to the cloud service to specify that the cloud service is in a deactivating state. Subsequent to completing the logical pause process, workflow manager 306 transmits update command 320 to metadata manager 308.

Responsive to receiving a notification indicating a cloud service has not been used for a second predetermined amount of time following the first predetermined amount of time (e.g., notification 232), workflow manager 306 utilizes deactivation logic 314 to instantiate a deactivation workflow that includes generating deactivation signal 234 to deactivate the cloud service.

Metadata manager 308 manages metadata 118 stored in metadata store 108 of FIG. 1. For example, metadata manager 308 transmits update signal 224 or update signal 242 to update metadata 118 to specify that the cloud service is in an active state (e.g., in response to receiving update command 316), transmits update signal 228 to update metadata 118 to specify that the cloud service is in a deactivated state (e.g., in response to receiving update command 320), transmits update signal 324 to update metadata 118 to specify that the cloud service is in an activating state (e.g., in response to receiving update command 318), and/or transmits update signal 326 to update metadata 118 to specify that the cloud service is in a deactivating state (e.g., in response to receiving update command 322).

III. Example Method Embodiments

Figures 4A, 4B, 4C:
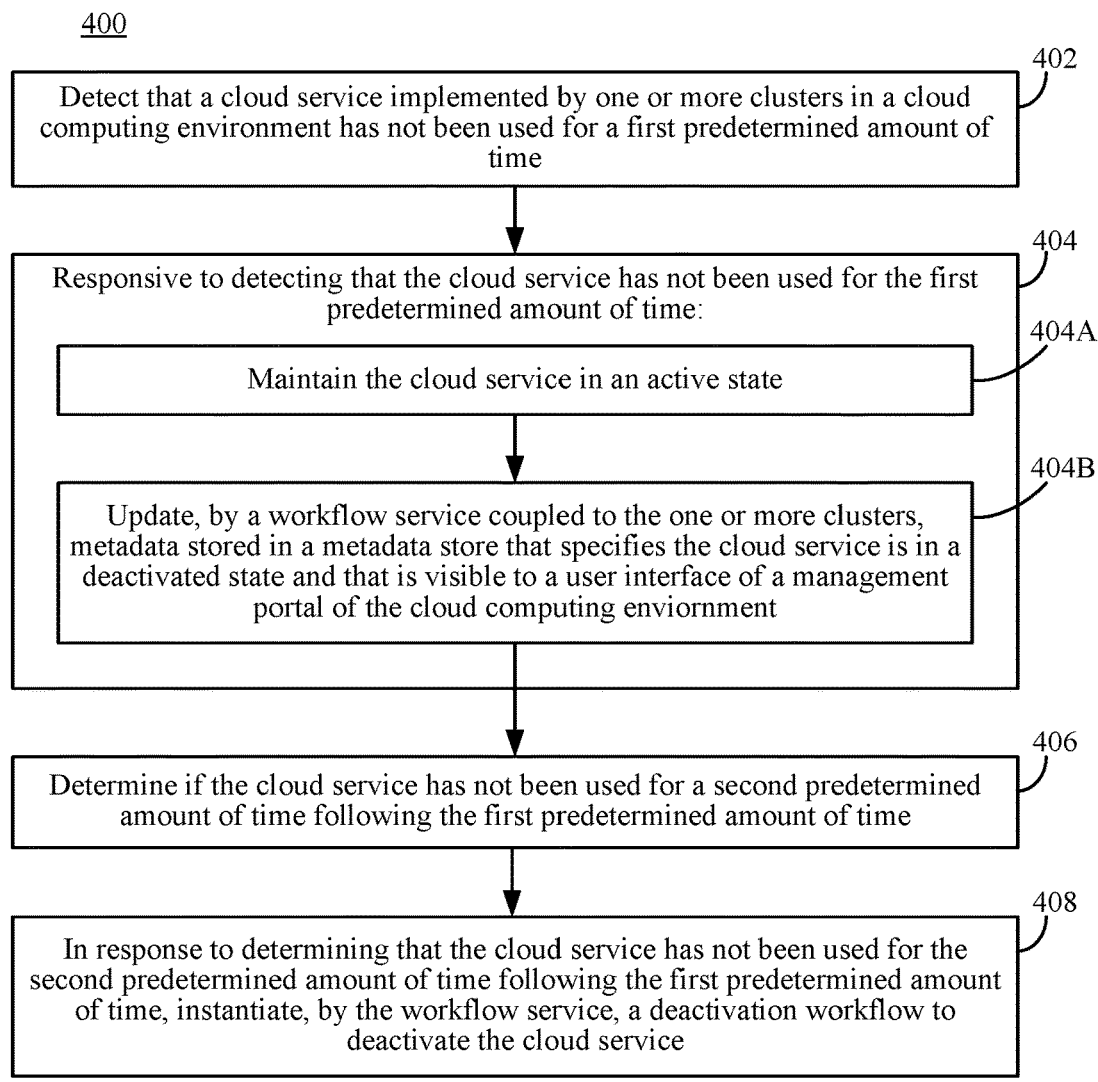
FIG. 4A depicts a flowchart of a process for managing cloud services implemented by one or more clusters in a cloud computing environment, in accordance with an embodiment.
FIG. 4B depicts a flowchart of an example process for logically pausing a cloud service, in accordance with an embodiment.
FIG. 4C depicts a flowchart of another example process for logically pausing a cloud service, in accordance with an embodiment.

Embodiments and techniques of the present disclosure include methods for managing cloud services implemented by one or more clusters in a cloud computing environment. For instance, system 100 of FIG. 1, system 200 of FIG. 2, and workflow service 300 of FIG. 3 may operate in various ways, in embodiments. For example, FIG. 4A depicts a flowchart 400 of a process for managing cloud services implemented by one or more clusters in a cloud computing environment, in accordance with an embodiment. In an embodiment, system 100 or system 200 may operate to perform one or all of the steps of flowchart 400. Flowchart 400 is described as follows with respect to system 200 of FIG. 2. Further structural and operational embodiments will be apparent to persons skilled in the relevant art(s) based on the following description. Note that not all steps of flowchart 400 need to be performed in all embodiments.

Flowchart 400 beings with step 402. In step 402, a detection that a cloud service implemented by one or more clusters in a cloud computing environment has not been used for a first predetermined amount of time is made. For example, cloud service engine 210 of FIG. 2 detects that cloud service 206 implemented by node 202 in cloud computing environment 130 of FIG. 1 has not been used for a first predetermined amount of time. As described above with respect to FIG. 2, cloud service engine 210 generates notification 226 indicating such detection was made.

Responsive to step 402, step 404 is performed. As shown in FIG. 4A, step 404 includes substeps 404A and 404B. Substeps 404A and 404B may be performed in any order or concurrently. Note that not all substeps of step 404 need to be performed in all embodiments. In step 404A, the cloud service is maintained in an active state. For example, workflow service 126 of FIG. 2 receives notification 226 and maintains cloud service 206 in an active state. In some embodiments, maintaining cloud service 206 in an active state involves taking no action with respect to cloud service 206.

In step 404B, metadata stored in a metadata store is updated by a workflow service coupled to the one or more clusters. The metadata specifies the cloud service is in a deactivated state and is visible to a user interface of a management portal of the cloud computing environment. For example, workflow service 126 of FIG. 2 generates update signal 228 to update metadata 118 stored in metadata store 108 of FIG. 1 to specify that cloud service is in a deactivated state (i.e., while maintaining cloud service 206 in an active state). Metadata 118 is visible to user interface 128 of management portal 122 associated with cloud computing environment 130. In this context, workflow service 126 updates metadata 118 in a manner that a user of user interface 128 perceives cloud service 206 as deactivated while maintaining cloud service 206 in an active state. As will be discussed further below with respect to FIGS. 4B and 4C, workflow service 126 may be configured to perform other steps in addition to or alternative to steps 404A and/or 404B to logically pause cloud service 206.

In step 406, a determination if the cloud service has not been used for a second predetermined amount of time following the first predetermined amount of time is made. For example, cloud service engine 210 of FIG. 2 is configured to determine if cloud service 206 has not been used for a second predetermined amount of time following the first predetermined amount of time. If cloud service engine 210 determines that the cloud service 206 has not been used for the second predetermined amount of time, cloud service engine 210 generates notification 232 and flowchart 400 proceeds to 408. Otherwise, cloud service engine 210 resets a coldness timer that tracks the amount of time since user activity was last detected.

In step 408, in response to determining that the cloud service has not been used for the second predetermined amount of time following the first predetermined amount of time, the workflow service instantiates a deactivation workflow to deactivate the cloud service. For example, in response to receiving notification 232, workflow service 126 of FIG. 2 instantiates a deactivation workflow to deactivate cloud service 206, as described above with respect to FIG. 2.

Note that workflow service 126 and workflow service 300 may logically pause a cloud service in various ways. For example, FIG. 4B depicts a flowchart 410 of an example process for logically pausing a cloud service, in accordance with an embodiment. In an embodiment, workflow service 126 of FIGS. 1 and 2 or workflow service 300 of FIG. 3 may operate to perform one or all of the steps of flowchart 410. Flowchart 410 is described as follows with respect to system 200 of FIG. 2. Further structural and operational embodiments will be apparent to persons skilled in the relevant art(s) based on the following description. Note that flowchart 410 need not be performed in all embodiments.

Flowchart 410 includes step 404C, which may be a substep of step 404 of flowchart 400 described above with respect to FIG. 4A. In step 404C, a command is transmitted by a workflow service to one or more clusters that implement a cloud service. The command includes instructions to stop a billing service corresponding to the cloud service that is executing on the one or more clusters. For example, in response to receiving notification 226, workflow service 126 of FIG. 2 transmits command 230 to local agent 204, command 230 including instructions to stop billing service 212 corresponding to cloud service 206. In an alternate embodiment, billing service 212 is executing on a node other than node 202 (e.g., any of nodes 112 or nodes 114 of FIG. 1). In this alternate embodiment, workflow service 126 transmits command 230 to the local agent (or cluster service) corresponding to the node billing service 212 is executing on.

As stated above, workflow service 126 and workflow service 300 may logically pause a cloud service in various ways. For example, FIG. 4C depicts a flowchart 420 of another example process for logically pausing a cloud service, in accordance with an embodiment. In an embodiment, workflow service 126 of FIGS. 1 and 2 or workflow service 300 of FIG. 3 may operate to perform one or all of the steps of flowchart 420. Flowchart 420 is described as follows with respect to system 200 of FIG. 2. Further structural and operational embodiments will be apparent to persons skilled in the relevant art(s) based on the following description. Note that flowchart 420 need not be performed in all embodiments.

Flowchart 420 includes step 404D, which may be a substep of step 404 of flowchart 400 described above with respect to FIG. 4A. In step 404D, one or more resources associated with a cloud service are released while still maintaining the cloud service in an active state. For example, in response to receiving notification 226, workflow service 126 of FIG. 2 transmits command 230 to local agent 204, command 230 including instructions to release one or more of resources 208 associated with cloud service 206 while maintaining cloud service in an active state. Alternatively, workflow service 126 releases resources associated with cloud service 206 that are external to node 202 (e.g., resources of another node within the same cluster as node 202 or another cluster of the cloud computing environment).

Note that workflow service 126 and workflow service 300 may logically resume a cloud service in various ways. For example, FIG. 5 depicts a flowchart 500 of a process for logically resuming a cloud service, in accordance with an embodiment. In an embodiment, system 100 of FIG. 1, system 200 of FIG. 2, or workflow service 300 of FIG. 3 may operate to perform one or all of the steps of flowchart 500. Flowchart 500 is described as follows with respect to system 100 of FIG. 1, system 200 of FIG. 2, and workflow service 300 of FIG. 3. Further structural and operational embodiments will be apparent to persons skilled in the relevant art(s) based on the following description. Note that not all steps of flowchart 500 need to be performed in all embodiments.

Flowchart 500 begins with step 502. In step 502, a notification that a cloud service has been used during a second predetermined amount of time following a first predetermined amount of time is received. For example, workflow service 300 of FIG. 3 receives reactivation request notification 238 from gateway 124 of FIG. 1 subsequent to having received notification 226 from cloud service engine 210 of FIG. 2 and without having received notification 232 from cloud service engine 210. Reactivation request notification 238 in accordance with an embodiment includes information indicating that the second predetermined amount of time has not passed. Alternatively, workflow service 300 determines (e.g., utilizing activation logic 310) that the second predetermined amount of time has not passed (e.g., by determining that notification 232 has not been received).

Step 504 is performed by a workflow service responsive to step 502. As shown in FIG. 5, step 504 includes substeps 504A and 504B. Substeps 504A and 504B may be performed in either order or concurrently. Note that not all substeps of step 504 need to be performed in all embodiments. In step 504A, the cloud service is maintained in an active state. For example, workflow service 300 of FIG. 3 receives reactivation request notification 238 and maintains cloud service 206 of FIG. 2 in an active state.

In step 504B, metadata is updated by a workflow service to specify that the cloud service is in the active state. For example, based on activation logic 310, workflow service 300 updates metadata 118 to specify that cloud service 206 of FIG. 2 is in an active state. In this context, workflow service 300 updates metadata 118 in a manner that a user of user interface 128 of FIG. 1 perceives cloud service 206 as activated while maintaining cloud service 206 in an active state. In this context, workflow service 300 logically resumes cloud service 206.

It is further contemplated herein that workflow service 300 may be configured to perform other steps in addition to or alternative to steps 504A and/or 504B to logically resume cloud service 206. For instance, workflow service 300 in accordance with an embodiment, based on activation logic 310, transmits a command to local agent 204 of FIG. 2 that includes instructions to resume billing service 212 corresponding to cloud service 206. In accordance with another embodiment, workflow service 300, based on activation logic 310, transmits a command to local agent 204 of FIG. 2 that includes instructions to reclaim, reactivate, activate, attach, and/or otherwise associate one or more of resources 208 associated with cloud service 206 that had been released during a logical pause operation (e.g., as part of step 404D of FIG. 4C).

Note that cloud services may be activated in various ways. For example, FIG. 6 depicts a flowchart 600 of a process for activating a cloud service, in accordance with an embodiment. In an embodiment, system 100 of FIG. 1 or system 200 of FIG. 2 may operate to perform one or all of the steps of flowchart 600. Flowchart 600 is described as follows with respect to system 100 of FIG. 1 and system 200 of FIG. 2. Further structural and operational embodiments will be apparent to persons skilled in the relevant art(s) based on the following description. Note that not all steps of flowchart 600 need to be performed in all embodiments.

Flowchart 600 begins with step 602. In step 602, user activity with respect to a cloud service is detected after instantiating a deactivation workflow. For example, gateway 124 of FIG. 1 detects user activity (e.g., via user input from user interface 128), processes the user activity to determine that the user activity is with respect to cloud service 206 of FIG. 2, and transmits reactivation request notification 238 to workflow service 126.

Step 604 is performed by a workflow service responsive to step 602. As shown in FIG. 6, step 604 includes substeps 604A and 604B. Substeps 604A and 604B may be performed in either order or concurrently. Note that not all substeps of step 604 need to be performed in all embodiments. In substep 604A, an activation workflow for the cloud service is instantiated. For example, workflow service 126 of FIG. 2 receives and analyzes reactivation request notification 238 and metadata 118 corresponding to cloud service 202 to determine that a deactivation workflow has already been instantiated.

In substep 604B, the deactivation workflow is rolled back. For example, workflow service 126 rolls back the deactivation workflow (e.g., by transmitting abort signal 240 to local agent 204, instantiating an activation workflow, and/or updating metadata 118).

Note that deactivation workflows may deactivate a cloud service in various ways. For example, FIG. 7 depicts a flowchart 700 of a process for deactivating a cloud service, in accordance with an embodiment. In an embodiment, system 200 of FIG. 2 may operate to perform one or all of the steps of flowchart 700. Flowchart 700 is described as follows with respect to system 200 of FIG. 2. Further structural and operational embodiments will be apparent to persons skilled in the relevant art(s) based on the following description. Note that not all steps of flowchart 700 need to be performed in all embodiments.

Flowchart 700 begins with step 702. In step 702, a compute resource related to a cloud service is removed from one or more clusters that implement the cloud service. For example, the deactivation workflow instantiated by workflow service 126 includes generating deactivation signal 234. Local agent 204 receives deactivation signal 234 and removes one or more of resources 208 from the clusters implementing cloud service 206.

In step 704, a remote storage attached to a node of the one or more clusters is unlinked from the node. For example, local agent 204, in response to receiving deactivation signal 234, unlinks a remote storage of remote storage 116 attached to node 202 (not shown in FIG. 2).

IV. Further Example Embodiments and Advantages

As noted above, systems and devices may be configured in various ways for managing cloud services implemented by one or more clusters in a cloud computing environment. For instance, embodiments may logically pause a cloud service if it has not been used for a first predetermined amount of time. By logically pausing a cloud service, metadata corresponding to the cloud service specifies that the cloud service is in a deactivated state while the metadata is in an active state. Such embodiments decrease workflow latency, reduce workflow failure rate, reduce internal service load, and/or avoid race conditions.

Metadata corresponding to cloud services has been described herein as being visible to a user interface of a management portal. It is also contemplated herein that, in some embodiments, a portion of the metadata is not visible to the user interface. For example, a workflow service in accordance with an embodiment updates a first portion of metadata corresponding to a cloud service that is visible to the user interface to specify a perceived state of the cloud service (i.e., specifying that the cloud service is in an active state when in an active state and not logically paused, specifying that the cloud service is in a deactivated state when logically paused and/or deactivated, specifying that the cloud service is in a deactivating state during a logical pause process, and/or specifying that the cloud service is in an activating state during a logical resume and/or an activation workflow) and updates a second portion of metadata corresponding to the cloud service that is not visible to the user interface to specify the actual state of the cloud service (i.e., specifying that the cloud service is in an active state when active and/or logically paused, specifying that the cloud service is in a deactivated state when deactivated, specifying that the cloud service is in a deactivating state during a deactivation workflow, and/or specifying that the cloud service is in an activating state during an activation workflow). In this context, workflow services determines the actual state of the cloud service by accessing the second portion of the metadata corresponding to the cloud service that is not visible to the user interface. Such workflow service compares the perceived state and the actual state of a cloud service to determine whether a cloud service is active, logically paused, deactivated, or in an intermediate state (logically resuming, deactivating, activating, logically pausing). In this context, the workflow service responds to incoming activation and/or reactivation request notifications and/or notifications indicating a cloud service has not been used for a first or second predetermined amount of time based at least on the perceived state and actual state of the cloud service.

Embodiments described herein have been described with respect to activation of cloud services based on detecting user activity or receiving a user request to activate a cloud service. It is further contemplated that embodiments may alternatively or additionally be configured such that on-disk data or format changes are able to cause on-demand activation of databases without detecting user activity or receiving a user request.

Furthermore, embodiments have been described as detecting that or determining if a cloud service has not been used for a predetermined amount of time. Embodiments may implement a timer that is set to the predetermined amount of time. Alternatively, an embodiment implements a cycle that checks whether or not a cloud service has been used and the predetermined amount of time is a predetermined number of cycle checks.

Moreover, according to the described embodiments and techniques, any components of systems, gateways, workflow services, clusters, nodes, local agents, cloud services, and/or cloud service engines and their functions may be caused to be activated for operation/performance thereof based on other operations, functions, actions, and/or the like, including initialization, completion, and/or performance of the operations, functions, actions, and/or the like.

In some example embodiments, one or more of the operations of the flowcharts described herein may not be performed. Moreover, operations in addition to or in lieu of the operations of the flowcharts described herein may be performed. Further, in some example embodiments, one or more of the operations of the flowcharts described herein may be performed out of order, in an alternate sequence, or partially (or completely) concurrently with each other or with other operations.

The embodiments described herein and/or any further systems, sub-systems, devices and/or components disclosed herein may be implemented in hardware (e.g., hardware logic/electrical circuitry), or any combination of hardware with software (computer program code configured to be executed in one or more processors or processing devices) and/or firmware.

V. Example Computer System Implementation

System 100, user computing device 102, cloud computing environment 130, computing device(s) 104, metadata store 108, clusters 110, nodes 112, nodes 114, remote storage 116, metadata 118, management portal 122, gateway 124, workflow service 126, user interface 128, system 200, node 202, local agent 204, cloud service 206, resources 208, cloud service engine 210, billing service 212, sub-services 214, workflow service 300, gateway interface 302, notification receiver 304, workflow manager 306, metadata manager 308, activation logic 310, logical pause logic 312, deactivation logic 314, flowchart 400, flowchart 410, flowchart 420, flowchart 500, flowchart 600, and/or flowchart 600 may be implemented in hardware, or hardware with any combination of software and/or firmware, including being implemented as computer program code configured to be executed in one or more processors and stored in a computer readable storage medium, or being implemented as hardware logic/electrical circuitry, such as being implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 8:
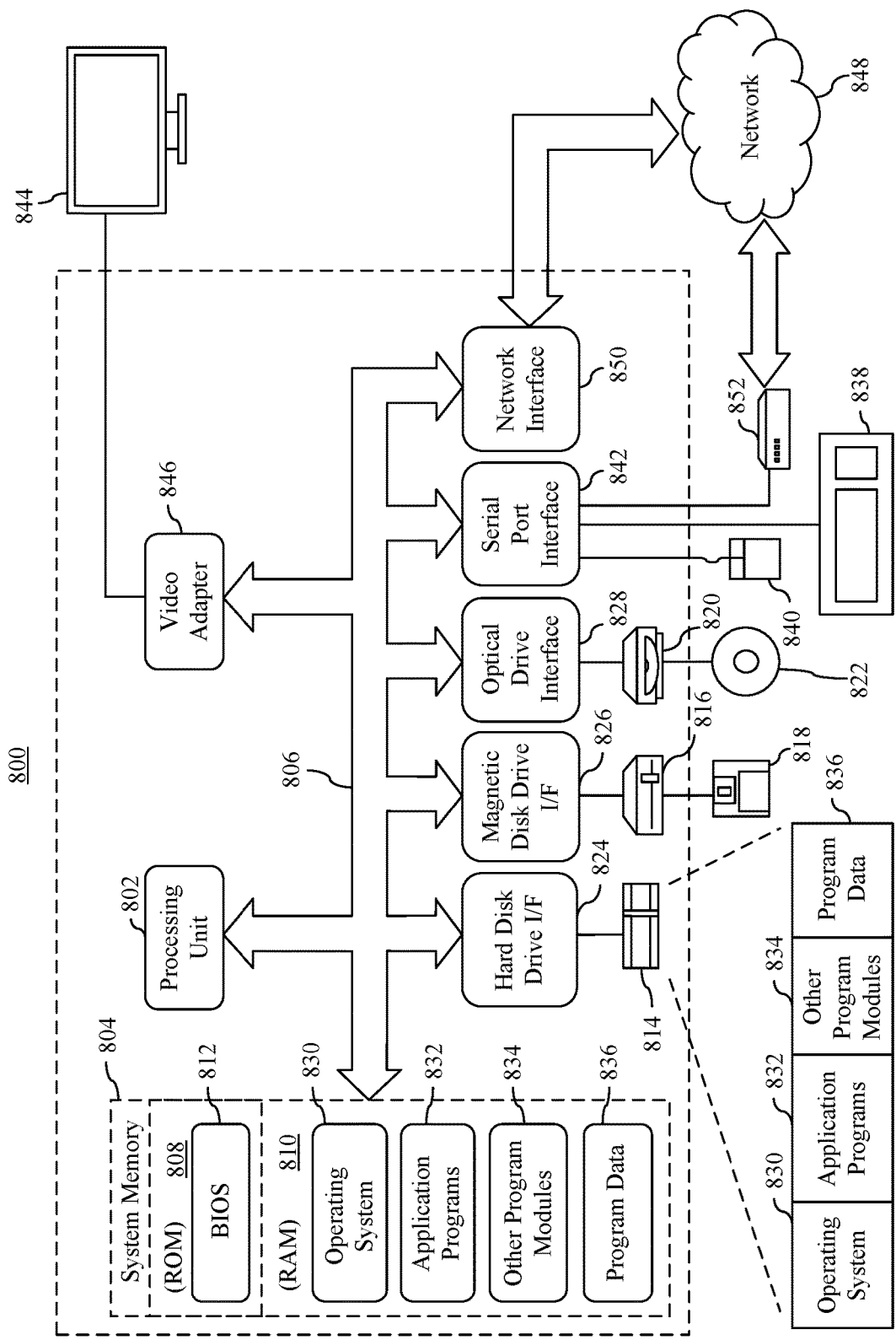
FIG. 8 is a block diagram of an example computing device that may be used to implement embodiments.

FIG. 8 depicts an example implementation of a computer system 800 ("system 800" herein) in which embodiments may be implemented. For example, system 800 may be used to implement system 100, user computing device 102, cloud computing environment 130, computing device(s) 104, metadata store 108, clusters 110, nodes 112, nodes 114, remote storage 116, metadata 118, management portal 122, gateway 124, workflow service 126, and/or user interface 128, as described above in reference to FIG. 1. System 800 may also be used to implement system 200, node 202, local agent 204, cloud service 206, resources 208, cloud service engine 210, billing service 212, and/or sub-services 214, as described above in reference to FIG. 2. System 800 may also be used to implement workflow service 300, gateway interface 302, notification receiver 304, workflow manager 306, metadata manager 308, activation logic 310, logical pause logic 312, and/or deactivation logic 314, as described above in reference to FIG. 3. System 800 may also be used to implement any of the steps of any of the flowcharts of FIGS. 4A-7, as described above. The description of system 800 provided herein is provided for purposes of illustration and is not intended to be limiting. Embodiments may be implemented in further types of computer systems, as would be known to persons skilled in the relevant art(s).

As shown in FIG. 8, system 800 includes one or more processors, referred to as processing unit 802, a system memory 804, and a bus 806 that couples various system components including system memory 804 to processing unit 802. Processing unit 802 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processing unit 802 may execute program code stored in a computer readable medium, such as program code of operating system 830, application programs 832, other program modules 834, etc. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random-access memory (RAM) 810. A basic input/output system 812 (BIOS) is stored in ROM 808.

System 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards and drives (e.g., solid state drives (SSDs)), digital video disks, RAMs, ROMs, and other hardware storage media.

A number of program modules or components may be stored on the hard disk, magnetic disk, optical disk, ROM, or RAM. These program modules include an operating system 830, one or more application programs 832, other program modules 834, and program data 836. In accordance with various embodiments, the program modules may include computer program logic that is executable by processing unit 802 to perform any or all the functions and features of metadata store 108, clusters 110, nodes 112, nodes 114, remote storage 116, metadata 118, management portal 122, gateway 124, workflow service 126, user interface 128, node 202, local agent 204, cloud service 206, resources 208, cloud service engine 210, billing service 212, sub-services 214, workflow service 300, gateway interface 302, notification receiver 304, workflow manager 306, metadata manager 308, activation logic 310, logical pause logic 312, deactivation logic 314, flowchart 400, flowchart 410, flowchart 420, flowchart 500, flowchart 600, and/or flowchart 700 (including any steps of flowcharts 400-700).

A user may enter commands and information into the system 800 through input devices such as keyboard 838 and pointing device 840. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processing unit 802 through a serial port interface 842 that is coupled to bus 806, but may be connected by other interfaces, such as a parallel port, game port, or a universal serial bus (USB).

A display screen 844 is also connected to bus 806 via an interface, such as a video adapter 846. Display screen 844 may be external to, or incorporated in, system 800. Display screen 844 may display information, as well as being a user interface for receiving user commands and/or other information (e.g., by touch, finger gestures, virtual keyboard, etc.). For example, display screen 844 may implement an interface (e.g., user interface 128 of FIG. 1). The interface may be configured to display metadata 118 and/or data stored in remote storage 116, as described with respect to FIG. 1, the state of cloud service 206, as described with respect to FIG. 2, and/or other information associated with management of cloud services implemented by one or more clusters in a cloud computing environment. In addition to display screen 844, system 800 may include other peripheral output devices (not shown) such as speakers and printers.

System 800 is connected to a network 848 (e.g., the Internet) through an adaptor or network interface 850, a modem 852, or other means for establishing communications over the network. Modem 852, which may be internal or external, may be connected to bus 806 via serial port interface 842, as shown in FIG. 8, or may be connected to bus 806 using another interface type, including a parallel interface.

As used herein, the terms "computer program medium," "computer-readable medium," and "computer-readable storage medium" are used to refer to physical hardware media such as the hard disk associated with hard disk drive 814, removable magnetic disk 818, removable optical disk 822, other physical hardware media such as RAMs, ROMs, flash memory cards, digital video disks, zip disks, MEMs, nano-technology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 832 and other program modules 834) may be stored on the hard disk, magnetic disk, optical disk, ROM, RAM, or other hardware storage medium. Such computer programs may also be received via network interface 850, serial port interface 842, or any other interface type. Such computer programs, when executed or loaded by an application, enable system 800 to implement features of embodiments described herein. Accordingly, such computer programs represent controllers of the system 800.

Embodiments are also directed to computer program products comprising computer code or instructions stored on any computer-readable medium. Such computer program products include hard disk drives, optical disk drives, memory device packages, portable memory sticks, memory cards, and other types of physical storage hardware. In accordance with various embodiments, the program modules may include computer program logic that is executable by processing unit 802 to perform any or all of the functions and features of metadata store 108, clusters 110, nodes 112, nodes 114, remote storage 116, metadata 118, management portal 122, gateway 124, workflow service 126, and/or user interface 128 as described above in reference to FIG. 1, node 202, local agent 204, cloud service 206, resources 208, cloud service engine 210, billing service 212, and/or sub-services 214 as described above in reference to FIG. 2, and/or workflow service 300, gateway interface 302, notification receiver 304, workflow manager 306, metadata manager 308, activation logic 310, logical pause logic 312, and/or deactivation logic 314 as described above in reference to FIG. 3. The program modules may also include computer program logic that, when executed by processing unit 802, causes processing unit 802 to perform any of the steps of any of the flowcharts of FIGS. 4A-7, as described above.

VI. Additional Example Embodiments

In an embodiment, a system includes one or more clusters in a cloud computing environment that implement a cloud service and one or more computers in the cloud computing environment that implement a workflow service. The cloud service includes a cloud service engine configured to detect that the cloud service has not been used for a first predetermined amount of time and determine if the cloud service has not been used for a second predetermined amount of time following the first predetermined amount of time. The workflow service is configured to, responsive to the cloud service engine detecting that the cloud service has not been used for the first predetermined amount of time, maintain the cloud service in an active state and update metadata stored in a metadata store that specifies the cloud service is in a deactivated state. The updated metadata is visible to a user interface of a management portal of the cloud computing environment. Responsive to the cloud service engine determining that the cloud service has not been used for the second predetermined amount of time following the first predetermined amount of time, the workflow service is configured to instantiate a deactivation workflow to deactivate the cloud service.

In an embodiment, the workflow service is further configured to receive a notification that the cloud service has been used during the second predetermined amount of time following the first predetermined amount of time. Responsive to receiving the notification, the workflow service is configured to maintain the cloud service in an active state and update the metadata to specify that the cloud service is in the active state.

In an embodiment, the one or more computers in the cloud computing environment that implement a workflow service further implement a gateway configured to detect user activity and, responsive to detecting user activity, generate the notification that the cloud service has been used during the second predetermined amount of time following the first predetermined amount of time.

In an embodiment, responsive to the cloud service engine detecting that the cloud service has not been used for the first predetermined amount of time, the workflow service is further configured to transmit a command to the one or more clusters that implement the cloud service. The command includes instructions to stop a billing service corresponding to the cloud service that is executing on the one or more clusters.

In an embodiment, the command includes instructions to stop one or more sub-services corresponding to the cloud service that is executing on the one or more clusters. The one or more sub-services include at least one of a provisioning service or a runtime service.

In an embodiment, the cloud service is a serverless application.

In an embodiment, the one or more computers in the cloud computing environment that implement the workflow service further implement a gateway configured to detect user activity with respect to the cloud service after the workflow service instantiates the deactivation workflow. The workflow service is further configured to, responsive to the gateway detecting the user activity with respect to the cloud service after the workflow service instantiates the deactivation workflow, instantiate an activation workflow for the cloud service and roll back the deactivation workflow.

In an embodiment, the deactivation workflow is configured to remove a compute resource related to the cloud service from the one or more clusters and unlink a remote storage attached to a node of the one or more clusters that implement the cloud service.

In an embodiment, the deactivation workflow is configured to lock the cloud service during deactivation of the cloud service.

In an embodiment, the deactivation workflow is configured to backup a transaction log associated with the cloud service.

In an embodiment, the deactivation workflow is configured to remove a compute resource related to the cloud service from the one or more clusters.

In an embodiment, the deactivation workflow is configured to unlink a remote storage attached to a node of the one or more clusters that implement the cloud service.

In an embodiment, the deactivation workflow is configured to drop a runtime resource associated with the cloud service.

In an embodiment, one or more of the first predetermined time period and the second predetermined time period are configurable on a customer-by-customer basis for different customers of the cloud computing environment.

In an embodiment, the workflow service is further configured to, responsive to the cloud service engine detecting that the cloud service has not been used for the first predetermined amount of time, release one or more resources associated with the cloud service while still maintaining the cloud service in the active state.

In an embodiment, a method of managing cloud services implemented by one or more clusters in a cloud computing environment is performed. The method includes detecting that a cloud service implemented by the one or more clusters has not been used for a first predetermined amount of time. Responsive to detecting that the cloud service has not been used for the first predetermined amount of time, the cloud service is maintained in an active state and metadata stored in a metadata store is updated by a workflow service coupled to the one or more clusters. The metadata specifies the cloud service is in a deactivated state and is visible to a user interface of a management portal of the cloud computing environment.

In an embodiment, the method of managing cloud services implemented by one or more clusters in a cloud computing environment described above includes determining if the cloud service has not been used for a second predetermined amount of time following the first predetermined amount of time. In response to determining that the cloud service has not been used for the second predetermined amount of time following the first predetermined amount of time, a deactivation workflow to deactivate the cloud service is instantiated by the workflow service.

In an embodiment, any of the methods of managing cloud services implemented by one or more clusters in a cloud computing environment described in any of the preceding paragraphs includes, by the workflow service, receiving a notification that the cloud service has been used during the second predetermined amount of time following the first predetermined amount of time. In response to receiving the notification the cloud service is maintained in an active state and the metadata is updated by the workflow service. The updated metadata specifies that the cloud service is in the active state.

In an embodiment, any of the methods of managing cloud services implemented by one or more clusters in a cloud computing environment described in any of the preceding paragraphs includes, responsive to detecting that the cloud service has not been used for the first predetermined amount of time, transmitting, by the workflow service, a command to the one or more clusters that implement the cloud service. The command includes instructions to stop a billing service corresponding to the cloud service that is executing on the one or more clusters.

In an embodiment, the cloud service of any of the methods of managing cloud services implemented by one or more clusters in a cloud computing environment described in any of the preceding paragraphs includes one of a serverless application.

In an embodiment, any of the methods of managing cloud services implemented by one or more clusters in a cloud computing environment described in any of the preceding paragraphs includes detecting user activity with respect to the cloud service after instantiating the deactivation workflow. Responsive to detecting the user activity with respect to the cloud service after instantiating the deactivation workflow, the method includes performing by the workflow service: instantiating an activation workflow for the cloud service; and rolling back the deactivation workflow.

In an embodiment, any of the methods of managing cloud services implemented by one or more clusters in a cloud computing environment described in any of the preceding paragraphs includes deactivating the cloud service. Deactivating the cloud service includes one or more of: locking the cloud service during said deactivating; backing up a transaction log associated with the cloud service; removing a compute resource related to the cloud service from the one or more clusters; unlinking a remote storage attached to a node of the one or more clusters that implement the cloud service; or dropping a runtime resource associated with the cloud service.

In an embodiment, one or more of the first predetermined time period and the second predetermined time period of any of the methods of managing cloud services implemented by one or more clusters in a cloud computing environment described in any of the preceding paragraphs are configurable on a customer-by-customer basis for different customers of the cloud computing environment.

In an embodiment, any of the methods of managing cloud services implemented by one or more clusters in a cloud computing environment described in any of the preceding paragraphs includes, responsive to detecting that the cloud service has not been used for the first predetermined amount of time, releasing one or more resources associated with the cloud service while still maintaining the cloud service in the active state.

In an embodiment, a cloud computing environment is configured to perform any of the methods of managing cloud services implemented by one or more clusters in a cloud computing environment described in any of the preceding paragraphs.

In an embodiment, a computer-readable storage medium has programming instructions encoded thereon that are executable by one or more processors to perform any of the methods of managing cloud services implemented by one or more clusters in a cloud computing environment described in any of the preceding paragraphs.

In an embodiment, a system is configured to manage workflows associated with cloud services implemented by one or more clusters in a cloud computing environment. The system includes one or more processors and one or more memory devices that store program code to be executed by the one or more processors. The program code includes a workflow service. The workflow service is configured to receive a first notification indicating that a cloud service implemented by the one or more clusters has not been used for a first predetermined amount of time. The workflow service is further configured to, responsive to receiving the first notification, maintain the cloud service in an active state and update metadata stored in a metadata store. The updated metadata specifies the cloud service is in a deactivated state and is visible to a user interface of a management portal of the cloud computing environment. The workflow service is further configured to receive a second notification indicating that the cloud service has not been used for a second predetermined amount of time following the first predetermined amount of time. Responsive to receiving the second notification, the workflow service is further configured to instantiate a deactivation workflow to deactivate the cloud service.

In an embodiment, the workflow service is further configured to receive a third notification indicating that the cloud service has been used during the second predetermined amount of time following the first predetermined amount of time. Responsive to receiving the third notification, the workflow service is further configured to maintain the cloud service in an active state and update the metadata to specify that the cloud service is in the active state.

In an embodiment, the program code includes a gateway. The gateway is configured to detect user activity and, responsive to detecting user activity, generate the third notification.

In an embodiment, responsive to receiving the first notification, the workflow service is further configured to transmit a command to the one or more clusters that implement the cloud service. The command includes instructions to stop a billing service corresponding to the cloud service that is executing on the one or more clusters.

In an embodiment, the command further includes instructions to stop one or more sub-services corresponding to the cloud service that is executing on the one or more clusters. The one or more sub-services include at least one of a provisioning service or a runtime service.

In an embodiment, the cloud service is a serverless application.

In an embodiment, the workflow service is configured to receive a fourth notification indicating that user activity with respect to the cloud service has been detected after the workflow service instantiates the deactivation workflow. Responsive to receiving the fourth notification, the workflow service is configured to instantiate an activation workflow for the cloud service and roll back the deactivation workflow.

In an embodiment, the program code includes a gateway. The gateway is configured to detect user activity with respect to the cloud service after the workflow service instantiates the deactivation workflow and, responsive to detecting user activity, generate the fourth notification.

In an embodiment, the deactivation workflow is configured to remove a compute resource related to the cloud service from the one or more clusters and unlink a remote storage attached to a node of the one or more clusters that implement the cloud service.

In an embodiment, the deactivation workflow is configured to lock the cloud service during deactivation of the cloud service.

In an embodiment, the deactivation workflow is configured to backup a transaction log associated with the cloud service.

In an embodiment, the deactivation workflow is configured to remove a compute resource related to the cloud service from the one or more clusters.

In an embodiment, the deactivation workflow is configured to unlink a remote storage attached to a node of the one or more clusters that implement the cloud service.

In an embodiment, the deactivation workflow is configured to drop a runtime resource associated with the cloud service.

In an embodiment, one or more of the first predetermined time period and the second predetermined time period are configurable on a customer-by-customer basis for different customers of the cloud computing environment.

In an embodiment, responsive to receiving the first notification, the workflow service is further configured to release one or more resources associated with the cloud service while still maintaining the cloud service in the active state.

In an embodiment, the system that includes one or more processors and one or more memory devices that store program code to be executed by the one or more processors described in any of the paragraphs above further includes one or more clusters in a cloud computing environment that implement a cloud service. The cloud service includes a cloud service engine configured to detect that the cloud service has not been used for a first predetermined amount of time and, in response to detecting that the cloud service has not been used for the first predetermined amount of time, generate the first notification. The cloud service engine is further configured to determine if the cloud service has not been used for a second predetermined amount of time following the first predetermined amount of time and, in response to determining that the cloud service has not been used for the second predetermined amount of time, generate the second notification.

In an embodiment, a method of managing workflows associated with cloud services implemented by one or more clusters in a cloud computing environment is performed. The method includes receiving, by a workflow service, a first notification indicating that a cloud service implemented by the one or more clusters has not been used for a first predetermined amount of time. Responsive to receiving the first notification, the cloud service is maintained in an active state and metadata stored in a metadata store is updated. The updated metadata specifies the cloud service is in a deactivated state and is visible to a user interface of a management portal of the cloud computing environment. A second notification indicating that the cloud service has not been used for a second predetermined amount of time following the first predetermined amount of time is received. Responsive to receiving the second notification, a deactivation workflow to deactivate the cloud service is instantiated by the workflow service.

In an embodiment, the method of managing workflows associated with cloud services implemented by one or more clusters in a cloud computing environment described above further includes receiving, by the workflow service, a third notification indicating that the cloud service has been used during the second predetermined amount of time following the first predetermined amount of time. Responsive to receiving the third notification, the cloud service is maintained in an active state and the metadata is updated to specify that the cloud service is in the active state.

In an embodiment, any of the methods of managing workflows associated with cloud services implemented by one or more clusters in a cloud computing environment described in any of the preceding paragraphs further includes, by a gateway, detecting user activity and, responsive to detecting user activity, generating the third notification.

In an embodiment, any of the methods of managing workflows associated with cloud services implemented by one or more clusters in a cloud computing environment described in any of the preceding paragraphs further includes, responsive to receiving the first notification, transmitting, by the workflow service, a command to the one or more clusters that implement the cloud service. The command includes instructions to stop a billing service corresponding to the cloud service that is executing on the one or more clusters.

In an embodiment, the command of any of the methods of managing workflows associated with cloud services implemented by one or more clusters in a cloud computing environment described in any of the preceding paragraphs further includes instructions to stop one or more sub-services corresponding to the cloud service that is executing on the one or more clusters. The one or more sub-services include at least one of a provisioning service or a runtime service.

In an embodiment, any of the methods of managing workflows associated with cloud services implemented by one or more clusters in a cloud computing environment described in any of the preceding paragraphs further includes receiving, by the workflow service, a fourth notification indicating that user activity with respect to the cloud service has been detected after said instantiating the deactivation workflow. Responsive to receiving the fourth notification, by the workflow service, an activation workflow for the cloud service is instantiated and the deactivation workflow is rolled back.

In an embodiment, any of the methods of managing workflows associated with cloud services implemented by one or more clusters in a cloud computing environment described in any of the preceding paragraphs further includes detecting, by a gateway, user activity with respect to the cloud service after said instantiating the deactivation workflow. Responsive to detecting user activity, a fourth notification is generated by the gateway.

In an embodiment, any of the methods of managing workflows associated with cloud services implemented by one or more clusters in a cloud computing environment described in any of the preceding paragraphs further includes deactivating the cloud service. Said deactivating the cloud service includes one or more of: removing a compute resource related to the cloud service from the one or more clusters, unlinking a remote storage attached to a node of the one or more clusters that implement the cloud service, locking the cloud service during deactivation of the cloud service, backing up a transaction log associated with the cloud service, or dropping a runtime resource associated with the cloud service.

In an embodiment, one or more of the first predetermined time period and the second predetermined time period of any of the methods of managing workflows associated with cloud services implemented by one or more clusters in a cloud computing environment described in any of the preceding paragraphs further includes are configurable on a customer-by-customer basis for different customers of the cloud computing environment.

In an embodiment, any of the methods of managing workflows associated with cloud services implemented by one or more clusters in a cloud computing environment described in any of the preceding paragraphs further includes, responsive to receiving the first notification, releasing, by the workflow service, one or more resources associated with the cloud service while still maintaining the cloud service in the active state.

In an embodiment, a cloud computing environment that includes one or more computers is configured to perform any of the methods of managing workflows associated with cloud services implemented by one or more clusters in a cloud computing environment described in any of the preceding paragraphs. The one or more computers implements a workflow service.

In an embodiment, the one or more computers of the above paragraph implements a gateway.

In an embodiment, a computer-readable storage medium has programming instructions encoded thereon that are executable by one or more processors to perform any of the methods of managing workflows associated with cloud services implemented by one or more clusters in a cloud computing environment described in any of the preceding paragraphs.

VII. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described example embodiments, but should be defined only in accordance with the following claims and their equivalents.

What is claimed is:

1. A system, comprising:
one or more clusters in a cloud computing environment that implement a cloud service, the cloud service comprising a cloud service engine configured to:
detect that the cloud service has not been used for a first predetermined amount of time; and
determine if the cloud service has not been used for a second predetermined amount of time following the first predetermined amount of time; and
one or more computers in the cloud computing environment that implement a workflow service, the workflow service configured to:
responsive to the cloud service engine detecting that the cloud service has not been used for the first predetermined amount of time, performing a logical pause by:
maintaining the cloud service in an active state, and
updating, without instantiating a deactivation workflow, metadata stored in a metadata store that specifies the cloud service is in a deactivated state and is visible to a user interface of a management portal of the cloud computing environment, wherein updating the metadata prior to the second predetermined amount of time prevents a race condition by an attempt to utilize the cloud service during instantiation of the deactivation workflow; and responsive to the cloud service engine determining that the cloud service has not been used for the second predetermined amount of time following the first predetermined amount of time:
  perform a physical pause by instantiating the deactivation workflow to deactivate the cloud service.

2. The system of claim 1, wherein the workflow service is further configured to:
  receive a notification that the cloud service has been used during the second predetermined amount of time following the first predetermined amount of time; and
  responsive to receiving the notification:
    maintain the cloud service in the active state; and
    update the metadata to specify that the cloud service is in the active state.

3. The system of claim 1, wherein, responsive to the cloud service engine detecting that the cloud service has not been used for the first predetermined amount of time, the workflow service is further configured to:
  transmit a command to the one or more clusters that implement the cloud service, the command including instructions to stop a billing service corresponding to the cloud service that is executing on the one or more clusters.

4. The system of claim 1, wherein the cloud service is a serverless application.

5. The system of claim 1, wherein:
  the one or more computers in the cloud computing environment that implement the workflow service further implement a gateway configured to detect user activity with respect to the cloud service after the workflow service instantiates the deactivation workflow; and
  the workflow service is further configured to, responsive to the gateway detecting the user activity with respect to the cloud service after the workflow service instantiates the deactivation workflow:
    instantiate an activation workflow for the cloud service; and
    roll back the deactivation workflow.

6. The system of claim 1, wherein the deactivation workflow is configured to:
  remove a compute resource related to the cloud service from the one or more clusters; and
  unlink a remote storage attached to a node of the one or more clusters that implement the cloud service.

7. The system of claim 1, wherein one or more of the first predetermined time period and the second predetermined time period are configurable on a customer-by-customer basis for different customers of the cloud computing environment.

8. The system of claim 1, wherein the workflow service is further configured to:
  responsive to the cloud service engine detecting that the cloud service has not been used for the first predetermined amount of time:
    release one or more resources associated with the cloud service while still maintaining the cloud service in the active state.

9. A method of managing cloud services implemented by one or more clusters in a cloud computing environment, the method comprising:
  detecting that a cloud service implemented by the one or more clusters has not been used for a first predetermined amount of time;
  responsive to detecting that the cloud service has not been used for the first predetermined amount of time, performing a logical pause by:
    maintaining the cloud service in an active state, and
    updating, by a workflow service coupled to the one or more clusters and without instantiating a deactivation workflow, metadata stored in a metadata store that specifies the cloud service is in a deactivated state and that is visible to a user interface of a management portal of the cloud computing environment, wherein updating the metadata prior to the second predetermined amount of time prevents a race condition by an attempt to utilize the cloud service during instantiation of the deactivation workflow;
  determining if the cloud service has not been used for a second predetermined amount of time following the first predetermined amount of time; and
  in response to determining that the cloud service has not been used for the second predetermined amount of time following the first predetermined amount of time:
    performing a physical pause by instantiating, by the workflow service, the deactivation workflow to deactivate the cloud service.

10. The method of claim 9, further comprising, by the workflow service:
  receiving a notification that the cloud service has been used during the second predetermined amount of time following the first predetermined amount of time; and
  in response to receiving the notification:
    maintaining the cloud service in the active state; and
    updating the metadata to specify that the cloud service is in the active state.

11. The method of claim 9, wherein the method further comprises:
  responsive to detecting that the cloud service has not been used for the first predetermined amount of time, transmitting, by the workflow service, a command to the one or more clusters that implement the cloud service, the command including instructions to stop a billing service corresponding to the cloud service that is executing on the one or more clusters.

12. The method of claim 9, wherein the cloud service comprises a serverless application.

13. The method of claim 9, further comprising:
  detecting user activity with respect to the cloud service after instantiating the deactivation workflow; and
  responsive to detecting the user activity with respect to the cloud service after instantiating the deactivation workflow, performing by the workflow service:
    instantiating an activation workflow for the cloud service; and
    rolling back the deactivation workflow.

14. The method of claim 9, wherein said deactivating the cloud service includes one or more of:
  locking the cloud service during said deactivating;
  backing up a transaction log associated with the cloud service;
  removing a compute resource related to the cloud service from the one or more clusters;
  unlinking a remote storage attached to a node of the one or more clusters that implement the cloud service; or
  dropping a runtime resource associated with the cloud service.

15. The method of claim 9, wherein one or more of the first predetermined time period and the second predetermined time period are configurable on a customer-by-customer basis for different customers of the cloud computing environment.

16. The method of claim 9, further comprising:
responsive to detecting that the cloud service has not been used for the first predetermined amount of time:
releasing one or more resources associated with the cloud service while still maintaining the cloud service in the active state.

17. A system configured to manage workflows associated with cloud services implemented by one or more clusters in a cloud computing environment, the system comprising:
one or more processors; and
one or more memory devices that store program code to be executed by the one or more processors, the program code comprising:
a workflow service configured to:
receive a first notification indicating that a cloud service implemented by the one or more clusters has not been used for a first predetermined amount of time;
responsive to receiving the first notification, performing a logical pause by:
maintaining the cloud service in an active state, and
updating, without instantiating a deactivation workflow, metadata stored in a metadata store that specifies the cloud service is in a deactivated state and is visible to a user interface of a management portal of the cloud computing environment, wherein updating the metadata prior to the second predetermined amount of time prevents a race condition by an attempt to utilize the cloud service during instantiation of the deactivation workflow;
receive a second notification indicating that the cloud service has not been used for a second predetermined amount of time following the first predetermined amount of time; and
responsive to receiving the second notification:
perform a physical pause by instantiating the deactivation workflow to deactivate the cloud service.

18. The system of claim 17, wherein the workflow service is further configured to:
receive a third notification indicating that the cloud service has been used during the second predetermined amount of time following the first predetermined amount of time; and
responsive to receiving the third notification:
maintain the cloud service in the active state; and
update the metadata to specify that the cloud service is in the active state.

19. The system of claim 17, wherein, responsive to receiving the first notification, the workflow service is further configured to:
transmit a command to the one or more clusters that implement the cloud service, the command including instructions to stop a billing service corresponding to the cloud service that is executing on the one or more clusters.

20. The system of claim 17, wherein, responsive to receiving the first notification, the workflow service is further configured to:
release one or more resources associated with the cloud service while still maintaining the cloud service in the active state.

* * * * *